(12) United States Patent
Barnes

(10) Patent No.: US 8,373,319 B1
(45) Date of Patent: Feb. 12, 2013

(54) METHOD AND APPARATUS FOR A PANCAKE-TYPE MOTOR/GENERATOR

(76) Inventor: Jerry Barnes, Whitakers, NC (US)

(*) Notice: Subject to any disclaimer, the term of this patent is extended or adjusted under 35 U.S.C. 154(b) by 209 days.

(21) Appl. No.: 12/889,847

(22) Filed: Sep. 24, 2010

Related U.S. Application Data

(60) Provisional application No. 61/245,761, filed on Sep. 25, 2009.

(51) Int. Cl.
*H02K 3/50* (2006.01)
*H02K 23/54* (2006.01)
*H02K 3/46* (2006.01)

(52) U.S. Cl. ............... 310/71; 310/156.32; 310/268; 310/254.1; 310/112; 310/184

(58) Field of Classification Search ............... 310/71, 310/156.32–156.37, 268, 254.1, 112, 184
See application file for complete search history.

(56) References Cited

U.S. PATENT DOCUMENTS

| | | | |
|---|---|---|---|
| 3,548,965 A | 12/1970 | Pierro | |
| 4,539,497 A | 9/1985 | Boyer | |
| 4,866,321 A * | 9/1989 | Blanchard et al. | 310/112 |
| 5,142,181 A * | 8/1992 | Newell | 310/268 |
| 5,334,898 A | 8/1994 | Skybyk | |
| 5,334,899 A | 8/1994 | Skybyk | |
| 5,731,649 A | 3/1998 | Caamano | |
| 5,793,137 A * | 8/1998 | Smith | 310/114 |
| 5,886,450 A | 3/1999 | Kuehnle | |
| 5,982,070 A | 11/1999 | Caamano | |
| 6,064,121 A * | 5/2000 | Shervington et al. | 290/1 A |
| 6,201,334 B1 | 3/2001 | Sargeant et al. | |
| 6,252,317 B1 | 6/2001 | Scheffer | |
| 6,288,470 B1 | 9/2001 | Breit | |
| 6,323,573 B1 * | 11/2001 | Pinkerton | 310/178 |
| 6,445,105 B1 * | 9/2002 | Kliman et al. | 310/268 |
| 6,603,233 B2 * | 8/2003 | Strohm | 310/178 |
| 6,700,252 B2 | 3/2004 | Fleshman et al. | |
| 6,836,036 B2 | 12/2004 | Dube | |
| 6,943,473 B2 * | 9/2005 | Furuse et al. | 310/112 |
| 6,995,494 B2 * | 2/2006 | Haugan et al. | 310/268 |
| 7,038,343 B2 | 5/2006 | Agnes et al. | |
| 7,088,024 B2 | 8/2006 | Agnes et al. | |
| 7,091,642 B2 | 8/2006 | Agnes et al. | |
| 7,193,333 B1 | 3/2007 | Kitch | |
| 7,242,125 B2 | 7/2007 | Schneider et al. | |
| 7,315,105 B2 * | 1/2008 | Hartmann | 310/254.1 |

(Continued)

FOREIGN PATENT DOCUMENTS

| | | |
|---|---|---|
| EP | 291295 | 11/1988 |
| EP | 1351367 | 10/2003 |

(Continued)

*Primary Examiner* — Burton Mullins

(74) *Attorney, Agent, or Firm* — Murphy, Bilak & Homiller, PLLC

(57) ABSTRACT

According to an example embodiment, a modular pancake-type electrical generator includes a rotor and a modular stator, along with a support for the modular stator. The rotor includes a plurality of spaced-apart magnets around its perimeter, while the modular stator comprises a plurality of coil modules. The support is configured for receiving and retaining the plurality of coil modules and it comprises a plurality of support sections. The support sections form a circular array, for surrounding the rotor. Each support section comprises an interior receptacle formed in a generator housing, and includes a set of coil module mounting points and electrical contacts that are molded into or otherwise anchored within the interior receptacle. The receptacles and coil modules may be keyed, e.g., according to electrical phase, such that a coil module is installable only in receptacles having the correct complementary keying.

16 Claims, 6 Drawing Sheets

U.S. PATENT DOCUMENTS

| | | | |
|---|---|---|---|
| 7,323,799 B2 * | 1/2008 | Naito et al. | 310/216.077 |
| 7,372,182 B2 * | 5/2008 | Poore et al. | 310/156.36 |
| 7,528,517 B2 * | 5/2009 | Shibukawa et al. | 310/208 |
| 7,567,010 B1 | 7/2009 | Farnia | |
| 7,579,742 B1 | 8/2009 | Rittenhouse | |
| 7,675,187 B2 | 3/2010 | Woods et al. | |
| 7,675,189 B2 | 3/2010 | Grenier | |
| 7,692,357 B2 | 4/2010 | Qu et al. | |
| 2003/0178896 A1 * | 9/2003 | Crane | 310/68 R |
| 2005/0046191 A1 * | 3/2005 | Cole et al. | 290/1 A |
| 2006/0028093 A1 * | 2/2006 | Minagawa et al. | 310/268 |
| 2006/0131985 A1 | 6/2006 | Qu | |
| 2006/0145562 A1 * | 7/2006 | Nakayama | 310/218 |
| 2007/0013251 A1 * | 1/2007 | Djuric | 310/113 |
| 2007/0247017 A1 | 10/2007 | Bumby | |
| 2007/0273233 A1 * | 11/2007 | Poore et al. | 310/156.37 |
| 2008/0106161 A1 * | 5/2008 | Matsuzaki et al. | 310/71 |
| 2009/0140526 A1 | 6/2009 | Jansen et al. | |
| 2009/0152965 A1 * | 6/2009 | Horng et al. | 310/71 |
| 2009/0218895 A1 | 9/2009 | Hsu | |
| 2009/0230695 A1 * | 9/2009 | Yoshida et al. | 290/1 A |
| 2009/0256430 A1 | 10/2009 | Farnia | |
| 2010/0007225 A1 | 1/2010 | Platon et al. | |
| 2010/0164235 A1 | 7/2010 | Woods et al. | |
| 2010/0186687 A1 * | 7/2010 | Kim et al. | 123/41.57 |

FOREIGN PATENT DOCUMENTS

| | | |
|---|---|---|
| EP | 1514340 | 8/2006 |
| EP | 1647081 | 3/2008 |
| EP | 2066005 | 6/2009 |
| KR | 2009048615 | 5/2009 |
| KR | 2009084551 | 8/2009 |
| WO | 03103114 | 12/2003 |
| WO | 2004073143 | 8/2004 |
| WO | 2005124967 | 12/2005 |
| WO | 2008014584 | 2/2008 |
| WO | 2008116463 | 10/2008 |
| WO | 2008116464 | 10/2008 |
| WO | 2009056850 | 5/2009 |

\* cited by examiner

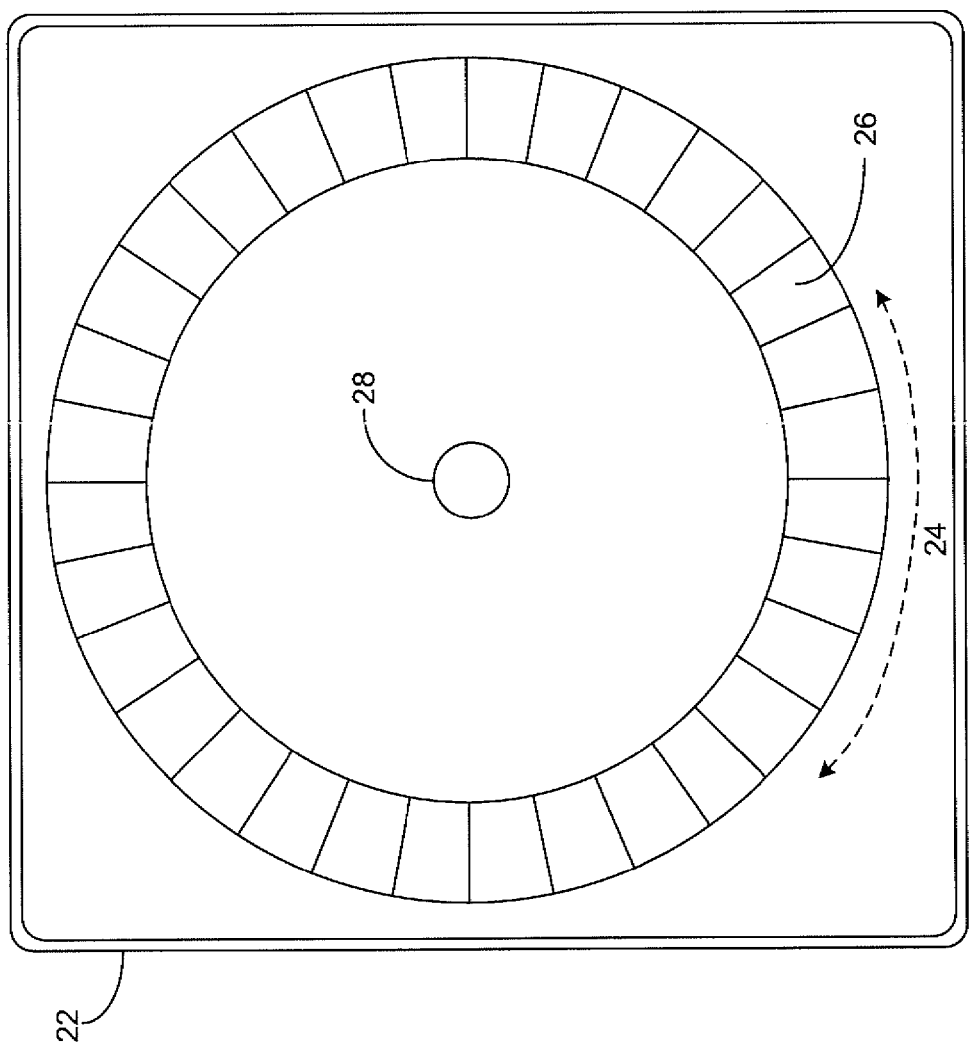
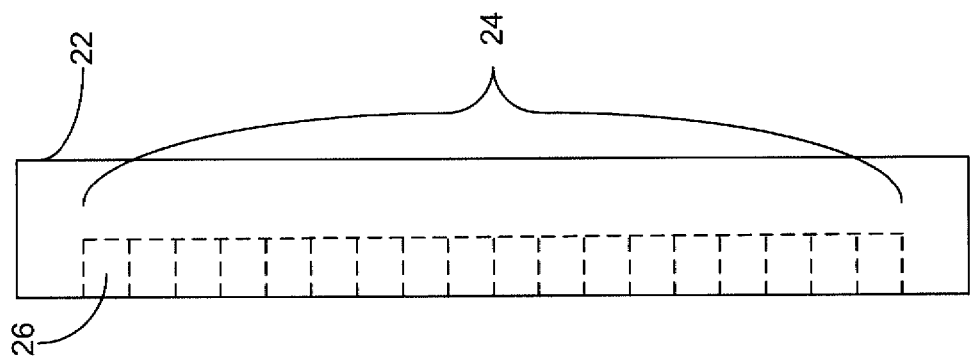
FIG. 2A
FIG. 2B

US 8,373,319 B1

METHOD AND APPARATUS FOR A PANCAKE-TYPE MOTOR/GENERATOR

RELATED APPLICATIONS

This application claims priority under 35 U.S.C. §119 from the U.S. provisional patent application filed on 25 Sep. 2009 and identified by App. No. 61/245,761.

FIELD OF THE INVENTION

The present invention generally relates to motors/generators, and particularly relates to a modular "pancake" style motor/generator.

BACKGROUND

Pancake style motor/generators are so named because their general design provides for a relatively thin, circular rotor concentrically surrounded by a ring-like stator. For generator configurations, the rotor often uses permanent magnets and is not externally excited, while the stator comprises a series of externally-excited conductive windings.

The above arrangement makes pancake generators ideal in a mechanical sense for certain applications, such as in wind turbine nacelles. In such applications, the pancake generator mounts axially along the wind-driven shaft, such that the rotor and shaft rotate together.

The electrical machine shown in WO 2005/124967 A1 (2005-12-29) provides a structural example, which may be regarded as a type of pancake construction. In the '967 publication, one sees a circumferential ring stator surrounding the perimeter of a disc-shaped rotor. The '967 publication refers to this arrangement as an "axial flux" machine, and that terminology often (but not always) is used to describe pancake style motor/generator arrangements. Other terms that are sometimes used to describe pancake style motor/generators include "toroidal motor/generators," where "toroidal" generally denotes the toroid-shaped stator structure positioned concentrically around a generally circular rotor (or rotor arms).

In any case, the general structure of pancake style motor/generators offers a number of design advantages, along with numerous challenges. For example, pancake style motor/generator construction poses a number of particular design challenges, in which the designer must balance the competing considerations of size, performance, power, and manufacturability/serviceability.

Of course, those skilled in the art will recognize that the particular design and construction details will depend on the targeted application. For various design approaches targeting a number of applications, see the following patent publications: US20090140526A1 (2009-06-04), US20090218895A1 (2009-09-03), EP1647081B1 (2008-03-26), WO2008014584A1 (2008-02-07), WO2008116463A1 (2008-10-02), WO200811646A2 (2008-10-02), and KR2009084551A (2009-08-05). From among these examples, and others, one begins to appreciate the range of design choices involved in optimizing the performance, manufacturability, and cost of a pancake motor/generator, for a particular use.

SUMMARY

According to an example embodiment, a modular pancake-type electrical generator includes a rotor and a modular stator, along with a support for the modular stator. The rotor includes a plurality of spaced-apart magnets around its perimeter, while the modular stator comprises a plurality of coil modules. The support is configured for receiving and retaining the plurality of coil modules and it comprises a plurality of support sections. The support sections form a circular array, for surrounding the rotor.

Each support section is configured to individually receive and retain a given one of the coil modules and comprises an interior receptacle formed in a generator housing. The housing comprises, for example, a formed enclosure, and it may be multi-piece to aid assembly and disassembly. Further, each support section includes a set of coil module mounting points and electrical contacts that are molded into or otherwise anchored within the interior receptacle.

In a non-limiting but advantageous example, the generator is a multi-phase generator and phase buses are mounted to or otherwise integrated within an interior surface of the generator housing. More particularly, the phase buses are positioned to run through or proximate the interior receptacles forming the support. As such, each interior receptacle provides one or more phase bus contacts, for electrically connecting the module coils to one or more respective phase buses. Indeed, in at least one embodiment disclosed herein, each interior receptacle includes a complete set of electrical contacts and mounting points for a coil module, and each coil module includes complementary sets of electrical contacts and mounting points.

Further, in the same or another embodiment, the generator is a multi-phase generator and each support section (of the modular stator support) and each coil module are mechanically keyed for a given phase. As such, a given coil module is installable only in those support sections that are mechanically keyed for the same phase as the coil module.

Of course, the present invention is not limited by the foregoing summary of example features and advantages. Those of ordinary skill in the art will recognize additional features and advantages from the following detailed description and the accompanying illustrations.

BRIEF DESCRIPTION OF THE DRAWINGS

FIG. 2A is a front view diagram of the interior of a generator housing in one embodiment, and FIG. 2B is a corresponding side view.

DETAILED DESCRIPTION

Figure 1:
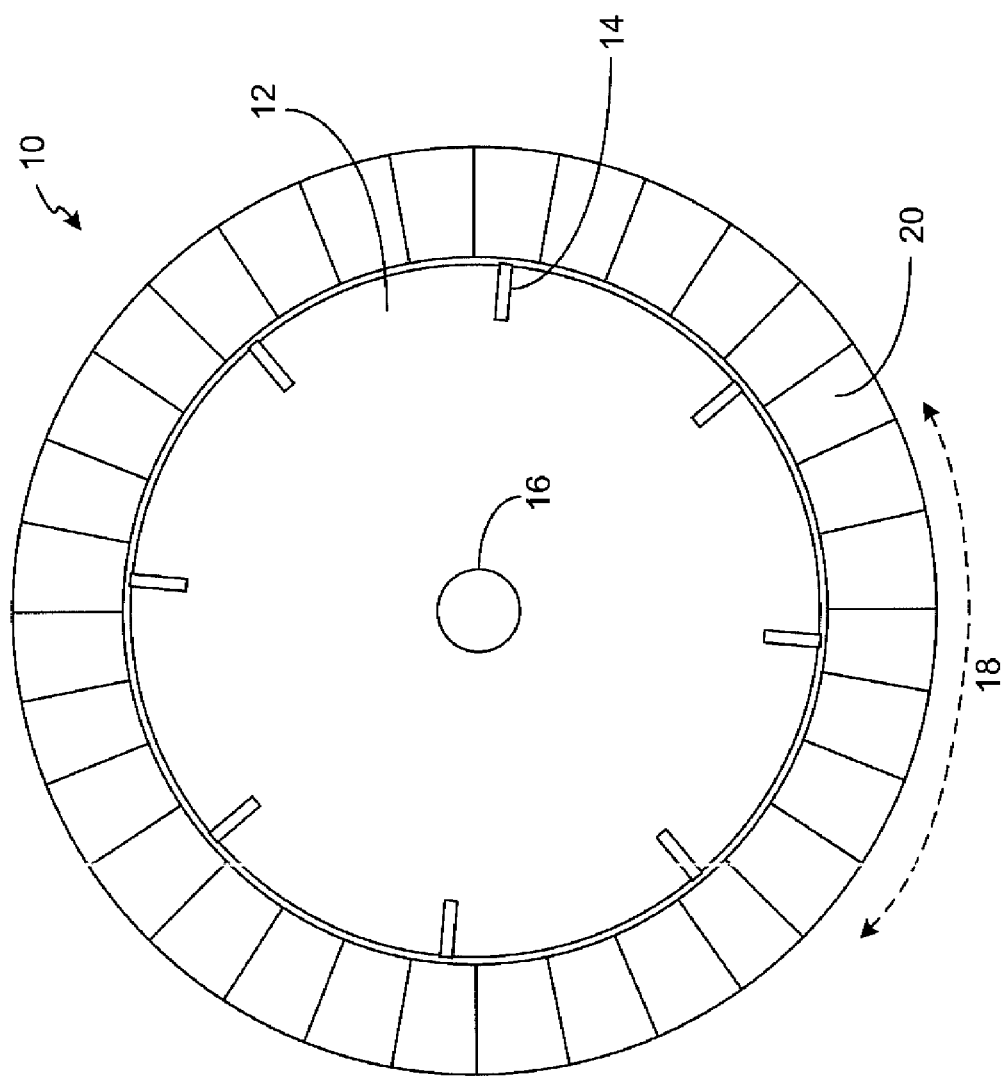
FIG. 1 is a simplified diagram of one embodiment of a modular pancake generator.

FIG. 1 partially illustrates one embodiment of the modular pancake-type electrical generator 10 provided herein. Notably, those skilled in the art will appreciate that the contemplated generator can, equivalently, be configured as an electric motor rather than a generator, based on supplying electrical power to the coils and taking rotational mechanical power from a rotor-driven shaft.

The illustrated generator 10 includes a rotor 12 having a plurality of spaced-apart magnets 14 around its perimeter. In one or more embodiments, the rotor 12 comprises a substantially flat disc-shaped member roughly two to three inches thick. Regardless, those skilled in the art will appreciate that the rotor 12 includes mounting locations for attaching the magnets 14 to the rotor 12, or otherwise integrates the magnets 14 into its body. One further sees that the rotor 12 includes a central opening 16, for receiving a shaft (not shown) and locking the rotor 12 onto the shaft. While shown as a circular opening, the opening 16 may be keyed or otherwise shaped to facilitate locked mounting of the rotor 12 onto the shaft.

The generator 10 further comprises a "modular" stator 18 comprising a plurality of coil modules 20. Here, the term "modular" connotes the design and construction of the stator 18 as a multi-piece assembly, which provides distinct manufacturing, installation, and servicing advantages for the generator 10. Those advantages yield significant service benefits and corresponding economic advantages when, as is contemplated for one or more embodiments herein, the generator 10 is mounted to and used with an engine that serves as the prime mover for a vehicle—e.g., a long-haul truck.

In such applications, the generator 10 is driven directly (or indirectly) by the engine's crankshaft and provides electrical power to one or more vehicle systems. As an example, one may refer to U.S. patent application Ser. No. 12/414,117, as filed on Mar. 30, 2009, which is entitled Intelligent Power Management System, and which is incorporated herein by reference in its entirety.

Continuing with basic elements of the generator 10, one sees from FIG. 2A that the generator 10 further includes a first generator housing 22, for at least partially enclosing the rotor 12 and modular stator 18. In at least one embodiment, the first generator housing 22 operates as one half of a two-part housing, for ease of installation and servicing of the generator. (Broadly, the first generator housing 22 may comprise the whole housing, or one piece in a multi-piece housing assembly. As will be understood, all or part of the housing may be a thermo-formed plastic, or other molded material, such as fiberglass, plastic, resin-impregnated composite, etc.)

Noting first that FIG. 2A provides an "interior" view of the housing 22, one sees that the housing 22 includes within its interior (or on its interior facing side, if the housing 22 is flat) a support 24, which is configured to receive and retain the plurality of coil assemblies 20 that comprise the modular stator 18. In the illustration, one sees that the support 24 comprises a plurality of support sections 26, where each support section 26 is configured to receive and retain a given one of the coil modules 20. Thus, to form the modular stator 18, one would install the full complement of coil modules 20 into the support 24, with one coil module 20 installed in each support section 26.

Further, in the illustrated embodiment, one sees that the support sections 26 are circularly arrayed, for surrounding the rotor 12. It should also be noted that the support 24 in one or more embodiments comprises a frame that includes mounting points for the coil assemblies, and that is configured for attachment within the interior of the generator housing 22. Further, in one or more embodiments, the frame and/or the interior of the generator housing 22 integrate electrical contacts for mating with the installed coil modules 20, and the frame and/or the interior of generator housing 22 may further carry phase buses, and all wiring needed to interconnect coil modules 20 in pole-pair or other connections, and to provide output power from the generator 10.

In another embodiment, the support 24 comprises a set of module coil mounting points and contacts—each such set may be regarded as one of the support sections 26. The mounting points and contacts are, for example, molded into or otherwise anchored within the interior of the generator housing 22. That is, each support section 26 may comprise a set of dedicated mounting points and electrical contacts for each coil module 20, where those mounting points and contacts are affixed to or anchored in the interior of the generator housing 22.

Still further, in at least one embodiment, the support sections 26 comprise dedicated recesses—referred to as interior receptacles—that are formed in the generator housing 22. In such embodiments, the support 24 comprises the collection of molded-in support sections 26, and any associated coil module mounting points, and associated electrical connections. (An example of this arrangement is shown in the side view of FIG. 2B.) Note, too, that module-to-module connections necessary for the desired electrical configuration of the modular stator 20 may be molded into the interior receptacles, or wiring raceways and electrical bus carriers may otherwise be formed within or proximate to them.

Thus, in at least one embodiment, the support sections 26 comprise formed or molded recesses that are matched to the form factor of the coil modules 20, such that each coil module 20 snaps into or otherwise mates with a support section 26. As noted, however, in another embodiment, each support section 26 comprises a framework or set of rigid mounting points for a given coil module 20 and the support 24 may itself be a modular assembly that is affixed within the interior of the housing 22. (Note that the housing 22 may or may not include a central opening 28, depending on whether the generator 10 is configured for use with a shaft that does or does not pass completely through the generator 10.)

Broadly, then, in any one or more of the embodiments contemplated for the support 24 and the support sections 26, it should be understood that the support 24 may, by itself, or in conjunction with wiring and other connections carried within the generator housing 22, allow for "automatic" connection of a given coil module 20 upon its installation into or on one of the support sections 26. Of course, in one or more other embodiments, it may be necessary to manually complete the required electrical connections after mounting a coil module 20 in one of the support sections 26, but even in such embodiments, it should be understood that the coil assemblies 20 are individually replaceable.

In all such embodiments, the teachings herein provide for the stator 18 as a modular assembly that is collectively formed from a plurality of coil modules 20, and where a support 24 comprises a plurality of support sections 26 that are each configured to receive and retain a given one of the coil modules 20. This arrangement advantageously provides for servicing and replacement of individual coil modules 20. Further, with this configuration, the rotor 12 includes no moving parts, thereby significantly limiting its failure modes and significantly enhancing its long-term reliability.

Figure 3:
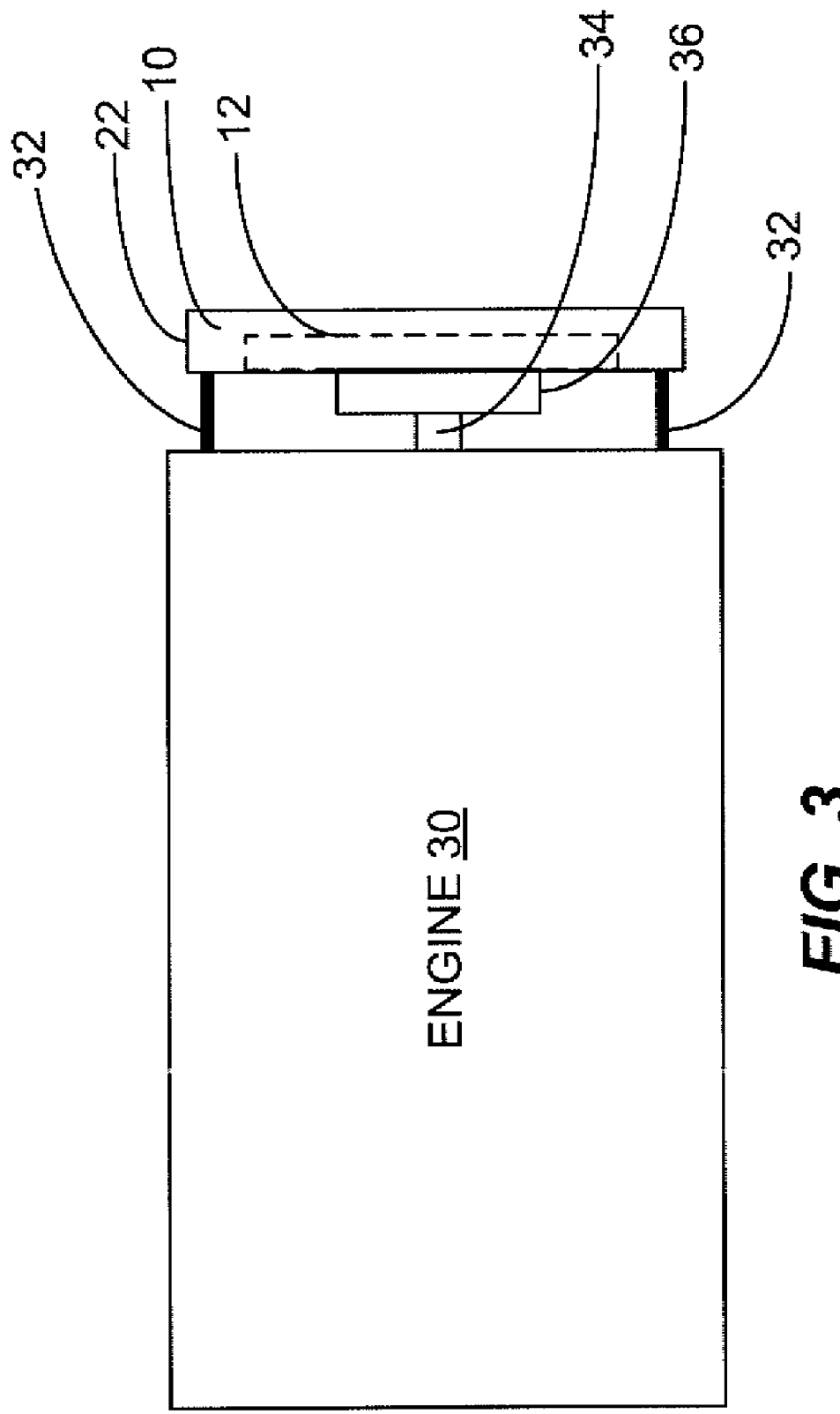
FIG. 3 is a block diagram of one embodiment of a modular pancake generator configured for mounting to an engine, such as an internal combustion engine.

The high-reliability and low maintenance attributes of the contemplated generator 10 offer significant advantages across a range of applications. As a non-limiting example, the generator 10 may be mounted to the exterior of an engine 30, such as is shown in FIG. 3. The engine 30 comprises, for example, the prime mover in a long-haul/over-the-road truck, where long service intervals and high-reliability are particularly valued.

One sees that the housing 22 (or another housing piece in embodiments that use a multi-piece housing) rigidly fixes to the engine 30 via one or more brackets 32. The brackets 32 and/or bracket mounting points on the generator 10 may be configured for particular makes/models of engines 30. The generator 10 thus offers bolt-on convenience in such embodiments.

One further sees that the generator 10 is centrally positioned with respect to the crankshaft 34 of the engine 30, for fixing the rotor 12 directly or indirectly to the crankshaft 34. In at least one such embodiment, the rotor 12 is associated with an accessory drive pulley 36 that is intended to provide belt-driven power to a variety of engine-driven accessories (not shown). In such embodiments, the pulley 36 is integrally formed as an extended component of the rotor 12 (which generally will project outside of the generator's housing). Alternatively, the pulley 36 and the rotor 12 comprise associated elements in an assembly that mounts to the crankshaft 34.

Broadly, in one or more embodiments, the rotor 12 is configured for mounting on an engine-driven shaft, where the first generator housing 22 (or a complementary second generator housing) is configured for mounting to an exterior of the engine providing the engine-driven shaft. Where the rotor is configured for mounting on an engine-driven shaft, it also may integrate or otherwise be coupled to an accessory drive pulley, such that the accessory drive pulley and the rotor 12 commonly mount to and rotate with the engine-driven shaft.

In at least one embodiment, the generator 20 is configured to output electrical power approximately at 60 Hz, responsive to the rotor being spun at or about 600 RPM. More particularly, it is recognized herein that the configuration of the generator 10 (in terms of coil pole pairs, magnet counts, etc.) can be tailored to the expected or nominal engine speeds associated with a given engine-driven generator. For example, if 60 Hz power is desired for a given engine idle speed, the configuration of the generator 10 is tailored to produce 60 Hz power for the characteristic idling RPM of the given engine. Of course, in any embodiment, the generator 10 may be paired with supplemental electrical equipment, such as a power inverter and/or power converter, which can produce smoothed output power and which can provide conditioned levels of AC and/or DC power, as desired.

In at least one embodiment, the rotor 12 includes twelve permanent magnets 14 that are equidistantly spaced around the perimeter of the rotor 12, in an alternating pole configuration—e.g., alternating N/S pole orientations. Further, the modular stator 18 comprises a three-phase stator having thirty-six coils 20 that are equidistantly spaced as a circular array. Diametrically opposing ones of these coils 20 constitute pole pairs. The coils 20 are subdivided into three sets of six pole pairs, in a three-phase Wye configuration, which is fully detailed later herein.

More broadly, in the same or other embodiments, generator 10 comprises a multi-phase generator. Advantageously, in at least one multi-phase embodiment of the generator 10, each support section 26 and each coil 20 assembly are mechanically keyed for a given (electrical) phase of the generator 10. As such, each given coil module 20 is installable only in those support sections 26 that are mechanically keyed for the same phase as the coil module 20. In this regard, it will be understood that there are different subsets of support sections 26, with each subset associated with a given phase, and that all support sections 26 within a given subset generally will use the same keying. As such, any coil module 20 that is keyed for a given one of the phases can be installed in any support section 26 that belongs to the subset of support sections 26 that is associated with that phase.

Figure 5:
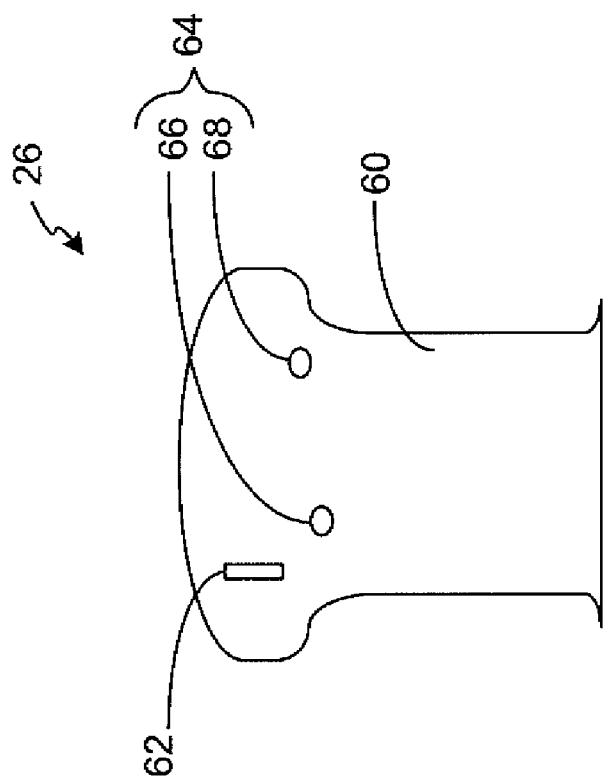
FIG. 5 is a diagram of an example support structure used in a modular stator support, which may be molded or otherwise formed in a generator housing as a circular array, for receiving coil modules.
Figure 4:
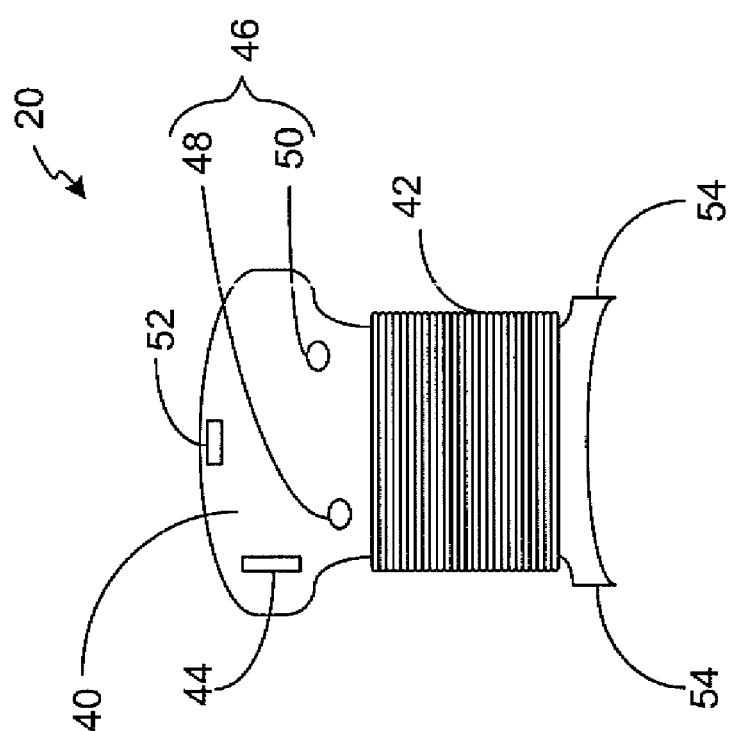
FIG. 4 is a diagram of an example coil module, forming part of a modular stator assembly.

FIGS. 4 and 5 provide non-limiting examples of keyed module/support-section configurations. Particularly, in FIG. 4, one sees an example coil module 20 comprising a body 40 that encloses or otherwise carries a wire coil 42. The body 40 is mechanically keyed, e.g., it includes a mechanical key 44. In the illustrated embodiment, the mechanical key 44 comprises a slot, hole or other opening, having a shape, size, configuration, body location, and/or other attribute that matches a corresponding receptacle keying. In another embodiment contemplated herein, the mechanical key 44 comprises a notch or other feature formed in a perimeter of the body 20, which matches a complementary receptacle keying feature.

Further, one sees that the example coil module 20 includes a set 46 of electrical contacts 48 and 50—e.g., each contact electrically connects to one end of the wire coil 42. Note that the set 46 of contacts 48 and 50 may project from the body 40, or they are otherwise exposed, for mating with corresponding contacts in a support section 26. Optionally, the coil module 20 includes a visible indicator 52 (e.g., a neon, LED, or other light, that forms an electrical circuit configured to illuminate the light when the assembly is correctly installed and operating within a running generator 10). Broadly, in at least one embodiment, each coil module 20 includes a visible indicator that is configured to indicate an operational status indication of the coil module 20 when the generator 10 is running.

Still further, one sees that the coil module 20 includes exposed metal contacts 54 on each side, which provide for magnetic flux coupling between coil modules 20, when they are mounted to adjacent support sections 26. Completing the modular stator 18, by installing the fall complement of coil modules in the plurality 24 of support sections 26. A completed ring of coil modules 20 thus establishes full metal-to-metal contact between the bodies 40 of the coil modules 20, for magnetic flux coupling. Each such body 40 may be made of laminate plate metal, for example. One or more embodiments further provide screw-on metallic plates that overlap adjacent modules 20 at their metal-to-metal contact points 54, for more robust interconnection.

As shown by way of non-limiting example in FIG. 5, each support section 26 comprises a receiver 60, which may be a formed or molded recess for receiving a coil module 20. Alternatively, each support section 26 comprises a set of mounting points or other such frame, for attaching a coil module 20. Note that, however constructed, the support sections 26 provide for inter-assembly contact between adjacent coil modules 20 at the metal contacts 54 of each coil module 20.

One also sees from FIG. 5 that each support section 26 includes a mechanical key 62 that matches one of the two or more keying configurations adopted for the coil modules 20. (Each support section 26 may include a mounting face, for example, from which the key 62 projects. Such a mounting also may be configured to carry hard points for mounting, etc.) Further, the support section 26 includes a set 64 of electrical contacts 66 and 68, which operate as a first set of electrical contacts for mating with the (second) set 46 of electrical contacts 48 and 50 in a given coil module 20.

In this configuration, mounting the coil module 20 to the support section 26 automatically establishes the required electrical connections. Note, too, that the desired mechanical keying may be accomplished by positioning of sizing of the electrical contacts, such that electrical connection is made only when the right configuration of coil module 20 is mounted to the right (matching) configuration of support section 26.

Thus, as a non-limiting example, the generator 10 comprises a multi-phase generator, and each support section 26 includes or is associated with a first set of electrical contacts, including a phase bus connection to one phase of the generator, and a pole connection to another pole connection in a complementary one of the support sections 26. For a given multi-phase configuration, complementary ones of the support sections 26 are those corresponding to diametrically-opposed coil modules 20 that together define a "pole pair." An example three-phase configuration of the generator 10 is shown in FIG. 6.

One sees three-phase output connections 70, which are provided, for example, at an externally accessible point or points in the generator housing 22. Suffixes "-1," "-2," and "-3" are used to denote the three different phases. One also sees three phase buses 72, likewise denoted as 72-1, 72-2, and 72-3, to distinguish between the three buses.

Figure 6:
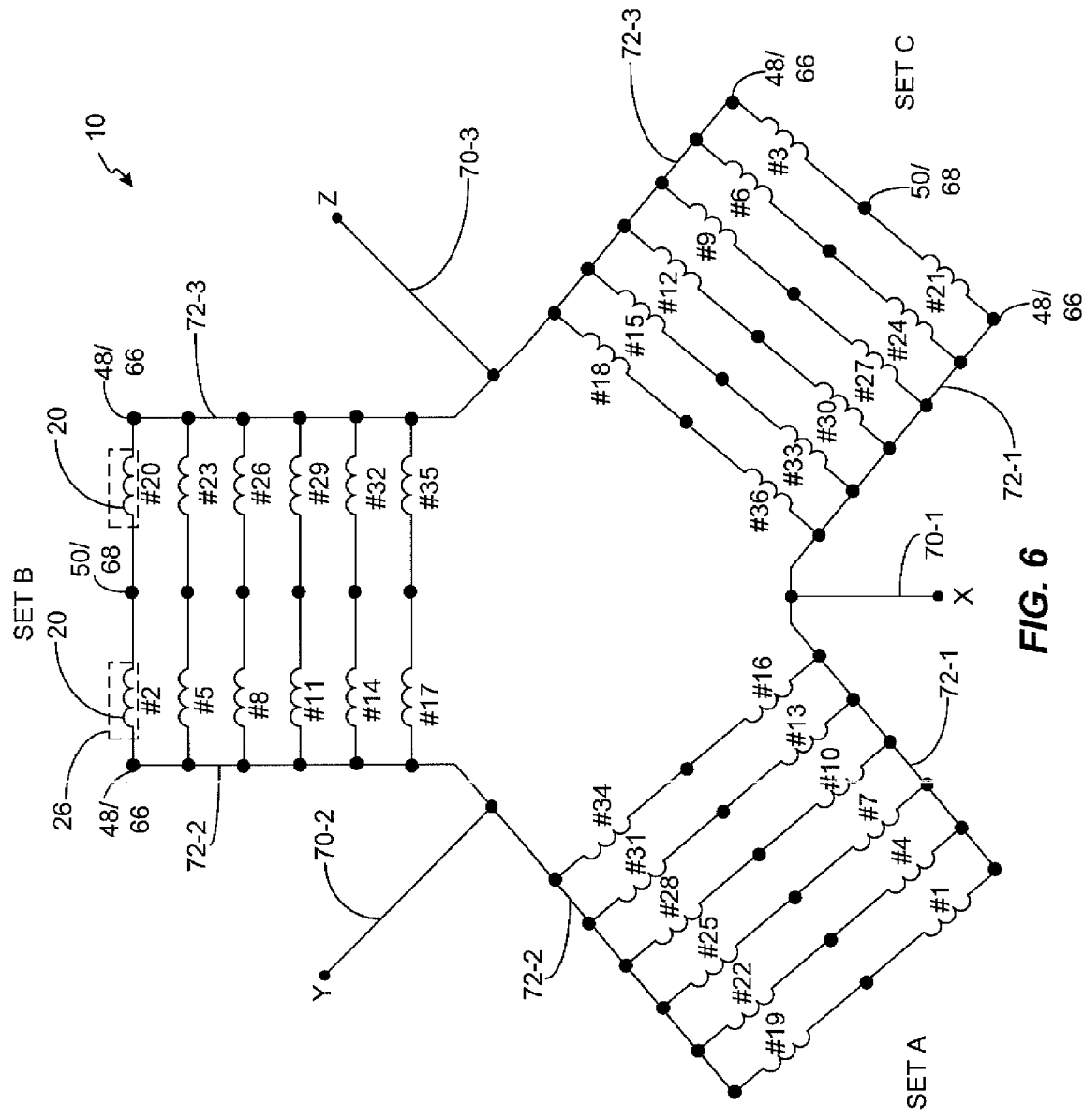
FIG. 6 is a schematic diagram illustrating example wiring/electrical connections for a multi-phase modular pancake generator.

FIG. 6 further depicts the sets 46 of coil module electrical contacts 48 and 50, and the complementary (mating) sets 64 of support section electrical contacts 66 and 68. Only two such mating sets are numbered, for simplicity, but it should be understood that installation of each coil module 20 automatically establishes electrical connectivity to the appropriate phase bus 72, and to the appropriate winding connection in the corresponding pole position on the other side of the stator ring. As such, it will be understood that at least one embodiment of the generator 10 includes interior wiring and/or buses, as needed, to establish electrical connections between and among the wire coils 42 within the modular stator 18, and to the generator outputs 70.

For example, referring to the top most coil modules 20 and support sections 26 in "SET B" of FIG. 6, one sees a #2 support section 26 and a corresponding #20 support section 26. The #2 and #20 support sections 26 are diametrically opposite in the circular array of support sections 26 and they carry the #2 and #20 coil modules 20, as a pole pair. Further, electrical contact 48 of the #2 coil module 20 connects with electrical contact 66 of the #2 support section 26, which in turn is connected to or integrated with the phase bus 72-2. Similarly, electrical contact 48 of the #20 coil module 20 connects with electrical contact 66 of the #20 support section 26. In turn, electrical contact 66 of the #20 support section 26 is connected to or integrated with the phase bus 72-3.

Finally, only a common pair of electrical contacts 50/68 is shown for the interconnection of the wire coils 42 in the #2 and #20 coil modules. However, it should be understood that the #2 support section 26 has its own electrical contact 68, for mating with the electrical contact 50 of the #2 coil module 20, and that the same is true for the #20 support section 26/coil module 20. A conductor or other electrical connection therefore may be integrated into the generator housing 22, or into the support 24, going between contact 50 in the #2 support section 26 and contact 50 in the #20 support section 26.

Indeed, in one or more embodiments contemplated herein, the generator 10 is pre-wired in that the support 24 and/or the interior shell of the generator housing, integrates the buses and inter-contact wiring needed to create a functioning generator, such that individual coil modules 20 are automatically wired into the generator's overall circuitry by virtue of mounting them to corresponding ones of the support sections 26.

Figure 7:
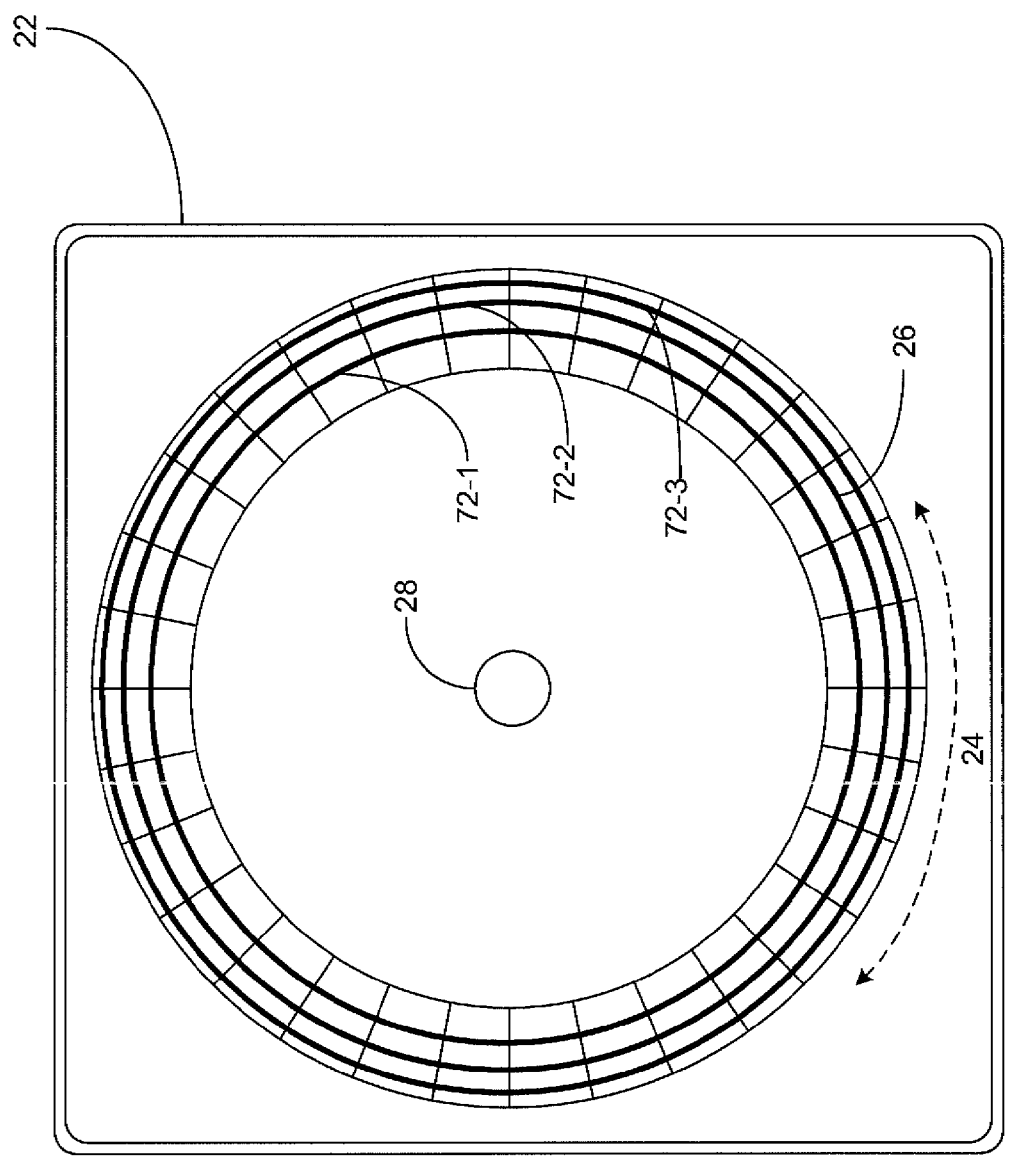
FIG. 7 is a diagram of the interior of a generator housing, illustrating an example embodiment where phase buses run through or proximate the support structures that are formed within the housing and used to form a modular stator support.

FIG. 7 illustrates a non-limiting example, wherein the first generator housing 22 incorporates three phase buses 72-1, 72-2, and 72-3 as conductive rings that pass through or under the circular array of support sections 26. As noted, the set 46 of electrical contacts 48 and 50 of each coil module 20 may be configured to contact the appropriate one of the phase buses 72.

With the above in mind, it will be understood that in one or more contemplated embodiments, each coil module 20 includes a second set of electrical contacts. The second set of electrical contacts is configured to mate with a first set of electrical contacts of a given support section 26, upon installation of the coil module 20 into the given support section 26.

Further, it will be appreciated that the support sections 26 are logically divided into as many subsets as there are generator phases. In at least one embodiment, each subset of support sections 26 may use a different physical arrangement for the first set of electrical contacts, and the second set of electrical contacts of each coil module 20 has a complementary physical arrangement that matches only one of the physical arrangements used for the first sets of electrical contacts in the support sections.

As noted, the support sections 26 are configured to provide for individual removal and replacement of individual coil modules 20. This allows for individual replacement of malfunctioning ones of the coil modules 20 comprising the modular stator 18.

Further, the coil modules 20 and the support sections 26 are configured to provide metal-to-metal contact between coil modules 20 installed in adjacent support sections 26, for magnetic flux coupling between the coil modules 20.

Still further, in one or more embodiments, each coil module 20 comprises a dipped body that is substantially covered in electrically-insulating material, except for one or more metal-to-metal contacts 54 for coupling to adjacent coil modules 20. For example, the body 40 shown in FIG. 4 may be dipped in plastic or rubberized material, where the metal-to-metal contacts 54 are masked off or otherwise uncovered after dipping. Of course, it will be understood that the set 46 of electrical contacts 48 and 50 (and the visible indicator 52, if used) will not be obstructed by the insulating covering.

Such an arrangement contemplates the general provisioning of the generator 10 as having a plurality of interior electrical contacts for mating with the sets of electrical contacts of the coil modules 20, upon installation of the coil modules 20 into the support sections 26. As an example, each support section 26 integrates a complementary set of electrical contacts for mating with the set of electrical contacts of an installed coil module 20. In multi-phase configurations, in particular, the first generator housing 22, or another pieces of multi-part generator housing, integrates phase buses corresponding to the generator phases. These phase buses run through or are proximate to the support sections 26 and each coil module 20 is configured to contact a corresponding one of the phase buses upon installation of the coil module 20 into a respective one of the support sections 26.

With the above non-limiting example embodiments in mind, those of ordinary skill in the art will recognize that the present invention provides, among other things, an advantageous design and construction for a pancake type motor/generator—where the term "generator" can be understood as encompassing a motor arrangement, unless otherwise noted. In particular, the teachings disclosed herein provide for a generator implementation that allows for simplified fabrication and assembly, and provides for simplified field servicing of the generator. For example, in one or more embodiments, problematic coil modules can be individually removed and replaced, with all requisite electrical connections being "automatically" established via complementary mounting points and electrical contacts between the coil modules and their respective stator support receptacles.

However, it is to be understood that the invention(s) is/are not to be limited to the specific example embodiments disclosed and that modifications and other embodiments are intended to be included within the scope of this disclosure. As such, the present invention is limited not by the foregoing disclosure, but rather by the patent claims and their legal equivalents.

What is claimed is:

1. A modular pancake-type electrical generator comprising:
   a rotor having a plurality of spaced-apart magnets around its perimeter;
   a modular stator comprising a plurality of coil modules; and
   a support for the modular stator that is configured for receiving and retaining the plurality of coil modules;
   wherein the support comprises a plurality of support sections, each support section configured to individually receive and retain a given one of the coil modules, and wherein the support sections form a circular array of support sections, for surrounding the rotor; and
   wherein each support section comprises an interior receptacle formed in a generator housing, and wherein each support section includes a set of coil module mounting points and electrical contacts that are molded into or otherwise anchored within the interior receptacle; and
   wherein the generator is a multi-phase generator and wherein phase buses are mounted to or otherwise integrated within an interior surface of the generator housing, and are positioned to run through or proximate said interior receptacles, such that one or more of said electrical contacts in each said receptacle housing comprises one or more phase bus contacts, for electrically connecting the module coils to the respective phase buses.

2. The generator of claim 1, wherein the support sections are configured to provide for individual removal and replacement of individual coil modules, such that malfunctioning ones of the coil modules comprising the modular stator are individually replaceable.

3. The generator of claim 1, wherein each coil module comprises a body that encloses or otherwise carries a wire coil, and further comprises a set of electrical contacts for respective ends of the wire coil and one or more mounting points, and wherein the electrical contacts and mounting points of each coil module are physically complementary with respect to one or more of the interior receptacles, such that the mounting points and electrical contacts between the coil module and the interior receptacle are aligned and engaged upon insertion of the coil module into the interior receptacle.

4. The generator of claim 1, wherein the generator housing integrates electrical contacts, inter-module wiring, and phase buses into the interior receptacles, such that installing a coil assembly into one of the interior receptacles connects it to corresponding electrical contacts carried within the interior receptacle.

5. The generator of claim 1, wherein the rotor is configured for mounting on an engine-driven shaft, and wherein the generator housing is configured for mounting to an exterior of an engine providing the engine-driven shaft.

6. The generator of claim 5, wherein the generator housing comprises at least two housing parts, including first and second parts, wherein the first part is configured for mounting to the exterior of the engine, based on having mounting points that align with or otherwise complement mounting points of the engine, and the second part is configured for engagement with the first part to partially or fully enclose the stator and rotor, and wherein the interior receptacles are formed within the first or second part.

7. The generator of claim 1, wherein the rotor is configured for mounting on an engine-driven shaft, and further comprising an accessory drive pulley integrated with or otherwise coupled to the rotor, such that the accessory drive pulley and the rotor commonly mount to and rotate with the engine-driven shaft, based upon the accessory drive pulley being engaged by a belt or other coupling member that is driven by the engine driving the engine-driven shaft.

8. The generator of claim 1, wherein the rotor includes twelve permanent magnets equidistantly spaced around the perimeter of the rotor and having an alternating pole configuration, and wherein the modular stator comprises a three-phase stator having thirty-six coils equidistantly spaced as a circular array.

9. The generator of claim 1, wherein the generator is configured to output electrical power approximately at 60 Hz, responsive to the rotor being spun at or about 600 RPM.

10. A modular pancake-type electrical generator comprising:
    a rotor having a plurality of spaced-apart magnets around its perimeter;
    a modular stator comprising a plurality of coil modules; and
    a support for the modular stator that is configured for receiving and retaining the plurality of coil modules;
    wherein the support comprises a plurality of support sections, each support section configured to individually receive and retain a given one of the coil modules, and wherein the support sections form a circular array of support sections, for surrounding the rotor; and
    wherein each support section comprises an interior receptacle formed in a generator housing, and wherein each support section includes a set of coil module mounting points and electrical contacts that are molded into or otherwise anchored within the interior receptacle; and
    wherein the generator is a multi-phase generator and each support section and each coil module are mechanically keyed for a given phase, so that a given coil module is installable only in those support sections that are mechanically keyed for the same phase as the coil module.

11. A modular pancake-type electrical generator comprising:
    a rotor having a plurality of spaced-apart magnets around its perimeter;
    a modular stator comprising a plurality of coil modules; and
    a support for the modular stator that is configured for receiving and retaining the plurality of coil modules;
    wherein the support comprises a plurality of support sections, each support section configured to individually receive and retain a given one of the coil modules, and wherein the support sections form a circular array of support sections, for surrounding the rotor; and
    wherein each support section comprises an interior receptacle formed in a generator housing, and wherein each support section includes a set of coil module mounting points and electrical contacts that are molded into or otherwise anchored within the interior receptacle; and
    wherein the generator is a multi-phase generator and wherein the electrical contacts for each support section comprise a first set of electrical contacts, including a phase bus connection to one phase of the generator, and a pole connection to another pole connection in a complementary one of the support sections.

12. The generator of claim 11, wherein each coil module includes a second set of electrical contacts, configured to mate with the first set of electrical contacts of a given support section, upon installation of the coil module into the given support section.

13. The generator of claim 12, wherein the support sections are logically divided into as many subsets as there are generator phases, and wherein each subset of support sections uses a different physical arrangement for the first set of electrical contacts, and wherein the second set of electrical contacts of each coil module has a complementary physical arrangement that matches only one of the physical arrangements used for the first sets of electrical contacts in the support sections.

14. A modular pancake-type electrical generator comprising:
    a rotor having a plurality of spaced-apart magnets around its perimeter;
    a modular stator comprising a plurality of coil modules; and
    a support for the modular stator that is configured for receiving and retaining the plurality of coil modules;
    wherein the support comprises a plurality of support sections, each support section configured to individually receive and retain a given one of the coil modules, and wherein the support sections form a circular array of support sections, for surrounding the rotor; and
    wherein each support section comprises an interior receptacle formed in a generator housing, and wherein each support section includes a set of coil module mounting points and electrical contacts that are molded into or otherwise anchored within the interior receptacle; and
    wherein each coil module includes a visible indicator that is configured to indicate an operational status indication of the coil module when the generator is running.

15. A modular pancake-type electrical generator comprising:
    a rotor having a plurality of spaced-apart magnets around its perimeter;
    a modular stator comprising a plurality of coil modules; and
    a support for the modular stator that is configured for receiving and retaining the plurality of coil modules;
    wherein the support comprises a plurality of support sections, each support section configured to individually receive and retain a given one of the coil modules, and wherein the support sections form a circular array of support sections, for surrounding the rotor; and
    wherein each support section comprises an interior receptacle formed in a generator housing, and wherein each support section includes a set of coil module mounting points and electrical contacts that are molded into or otherwise anchored within the interior receptacle; and
    wherein the coil modules and the support sections are configured to provide metal-to-metal contact between coil modules installed in adjacent support sections, for magnetic flux coupling between the coil modules, and wherein each coil module comprises a dipped body that is substantially covered in electrically-insulating material, except for one or more metal-to-metal contacts for coupling to adjacent coil modules.

16. A modular pancake-type electrical generator comprising:
    a rotor having a plurality of spaced-apart magnets around its perimeter;
    a modular stator comprising a plurality of coil modules; and
    a support for the modular stator that is configured for receiving and retaining the plurality of coil modules;
    wherein the support comprises a plurality of support sections, each support section configured to individually receive and retain a given one of the coil modules, and wherein the support sections form a circular array of support sections, for surrounding the rotor; and
    wherein the generator is a multi-phase generator and each support section and each coil module are mechanically keyed for a given phase, so that a given coil module is installable only in those support sections that are mechanically keyed for the same phase as the coil module.

* * * * *